May 17, 1955 L. H. WEISS 2,708,718

PHASE DETECTOR

Filed Nov. 26, 1952 2 Sheets-Sheet 1

INVENTOR.
LEON H. WEISS,
BY Nicholas T Volk
ATTORNEY.

INVENTOR.
LEON H. WEISS,
BY
Nicholas T. Volsk
ATTORNEY.

United States Patent Office 2,708,718

Patented May 17, 1955

2,708,718

PHASE DETECTOR

Leon H. Weiss, Beverly Hills, Calif., assignor, by mesne assignments, to Hughes Aircraft Company, a corporation of Delaware Application November 26, 1952, Serial No. 322,784

7 Claims. (Cl. 250—27)

This invention relates to signal detecting or demodulating circuits, and more particularly to a phase detector circuit employing electronic switching means for generating output signals representative of changes or shifts in phase of a wave to be detected.

The present invention constitutes an improvement over the type of detector circuit described in the technical paper entitled, "High Performance Demodulators for Servomechanisms," which appears in Proc. N. E. C., vol. 2, 1949, pp. 393–403. In connection with Figure 4 of this technical paper, a keyed demodulator for use in a servo system comprises a pair of triodes connected in a closed loop, to the grids of which reference signal voltages are applied in phase. A sinusoidal input wave in the form of a modulated carrier wave, whose magnitude and polarity vary with the servo error to be detected, is applied directly to one junction of the loop. The reference signal voltages applied to the control grids are of the carrier frequency and are much larger than the cut-off voltage for the tubes. Consequently, grid conduction takes place during the positive peaks of the reference signal to develop a bias voltage across a grid bias network having a time constant sufficiently long so that the bias voltage remains substantially constant between cycles, and plate-to-cathode conduction takes place only during a period of time corresponding to the positive peaks of the reference signal. Output signals representative of the servo error are developed across a capacitive output circuit coupled to the remaining junction of the loop.

In accordance with the present invention, a pair of keyed demodulators is selectively controlled or rendered operable by reference signal pulses which occur at fixed intervals of a variable phase input sine wave that is applied to both demodulators simultaneously. Output signals developed by the demodulators are representative of the amplitude of the input sine wave for successive time intervals during each cycle of the wave. Because even harmonics of the input sine wave may, when present, cause output signals to be developed which are greater or less in magnitude than output signals that would be truly representative of the magnitude of the input wave, provisions are made to suppress the even harmonics of the input wave sufficiently to insure the development of output signals which represent only the magnitude of the input wave.

It is, therefore, an object of this invention to provide an improved phase detector network which accurately detects changes in phase of an input sine wave and which develops output signals having a magnitude that accurately reflects the magnitude only of the input wave, whereby even harmonics of the input wave do not cause output signals to be developed which have magnitudes that do not represent that of the input wave.

It is another object of this invention to provide a phase detector network of the keyed demodulator type in which selective operation of the detector is effected by reference signal pulses that occur at fixed intervals during each cycle of an input sine wave.

It is still another object of this invention to provide an improved phase detector for a variable phase sine wave and means for suppressing even harmonics of the input signal, whereby output signals derived from the phase detector are true representations of the relative phase of the input wave with respect to fixed reference signals.

The novel features which are believed to be characteristic of the invention, both as to its organization and method of operation, together with further objects and advantages thereof, will be better understood from the following description considered in connection with the accompanying drawings in which several embodiments of the invention are illustrated by way of example, and the scope of the invention is pointed out in the appended claims.

Figure 1:
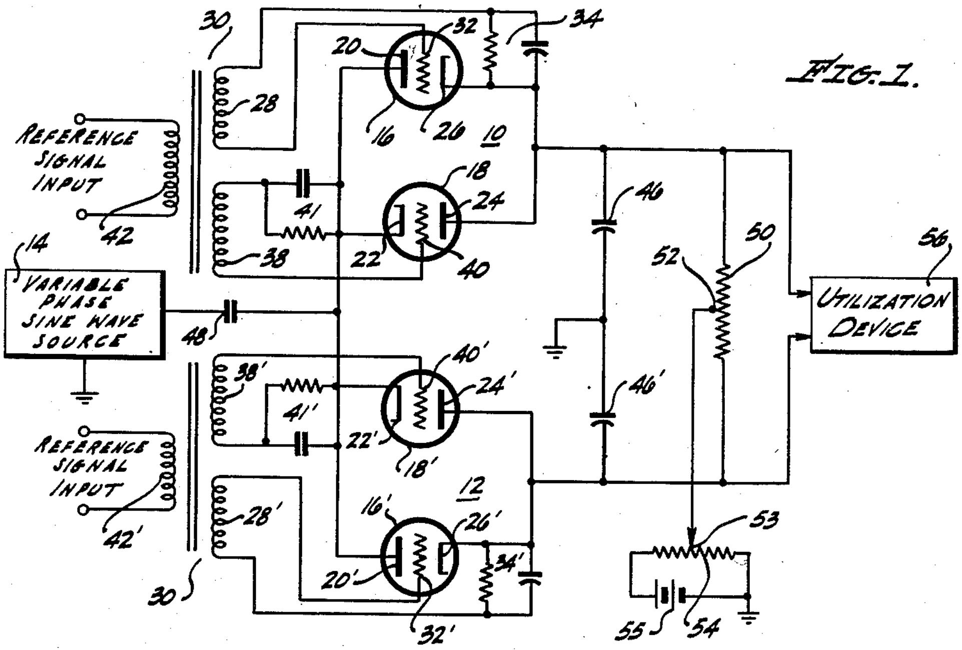
Fig. 1 is a schematic circuit diagram of a phase detector network for deriving signals representative of the phase position of an input sine wave, in accordance with this invention.

Referring to the drawings, in which like reference characters indicate like elements, and more particularly to Fig. 1, a phase detector network is shown comprising a pair of bi-directional switching circuits 10, 12 of the type discussed in the above mentioned publication, which are adapted to demodulate the output wave from a variable phase sine wave source 14. The two switching circuits 10, 12 are identical; hence, only the switching circuit 10 will be described and its operation explained. Switching circuit 10 comprises a pair of electron tubes 16, 18 which may be triodes as shown, connected in a closed loop in which the anode or plate 20 of one tube 16 is connected directly to the cathode 22 of the tube 18, while the anode 24 of the other tube 18 is connected to the cathode 26 of tube 16.

The grid-cathode circuit of tube 16 includes a secondary winding 28 of transformer 30 having one terminal connected to the control grid 32 of tube 16 while its other end is coupled to the cathode 26 through an RC (resistor-capacitor) network 34. Similarly another secondary winding 38 of transformer 30 has one terminal connected to the control grid 40 of tube 18 and its other terminal coupled to the cathode 22 through an RC network 41. Secondary windings 28 and 38 are so arranged that signals impressed upon the primary winding 42 of transformer 30 will be applied simultaneously and in phase to the control grids 32 and 40. Preferably, the RC networks 34, 41, which are self-biasing networks for tubes 16, 18, provide sufficient bias for their associated grids 32, 40 to render tubes 16, 18 non-conducting except upon the application of signals to primary winding 42. As will be explained more clearly hereafter, signals applied to primary winding 42 are preferably in the form of pulses which occur at fixed intervals of time and thus constitute reference signals.

The switching circuit 10 is adapted to have an input sine wave from source 14 applied at the junction of anode 20 and cathode 22. Load impedance means such as capacitor 46 is coupled between a point of reference or ground potential and the junction of anode 24 and cathode 26 for developing output signals upon tubes 16, 18 being rendered conducting.

As previously mentioned, primary winding 42 is adapted to apply reference signal pulses to grids 32 and 40 to make tubes 16 and 18 conduct. In accordance with this invention, such signal pulses effect conduction of tubes 16 and 18 at fixed intervals so that tubes 16 and 18 conduct once during each cycle of the input sine wave. The signal pulses constitute reference signals relative to which the phase of the input sine wave can be determined. Hence, tubes 16 and 18 conduct upon application of a reference signal pulse to amplify the portion of the sine wave that is present at that instant. The detection of the phase of the input sine wave relative to a reference signal pulse will be explained more clearly hereafter in connection with Figs. 2–5.

As previously mentioned, switching circuit 12 is identical to switching circuit 10; accordingly, numbered portions of switching circuit 12 are indicated by primes of the corresponding numbered portions of switching circuit 10. With respect to the reference signal pulses applied to primary winding 42′ of transformer 30′ associated with switching circuit 12, tubes 16′ and 18′ conduct in the same manner as switching circuit 10. However, in accordance with this invention, reference signal pulses applied to primary winding 42′, relative to the reference signal pulses applied to primary winding 42, effect conduction of tubes 16′ and 18′ at intervals 180° later during each cycle of the input sine wave.

Figs. 2–5 illustrate various phase positions of the input sine wave with respect to the reference signal pulses. It will be observed that four reference signal pulses are illustrated in Figs. 2–5 for each cycle of the input sine wave. Attention is directed only to reference signal pulses 42*a* and 42*a*′, which represent signal pulses applied, respectively, to primary windings 42 and 42′ of Fig. 1.

Figure 2:
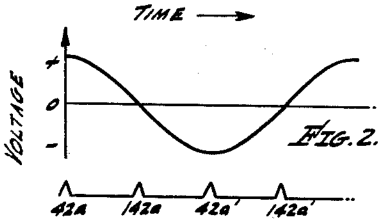
Figs. 2–5 are characteristic curves showing the input sine wave and reference signals applied to the circuit of Fig. 1 with different phase relationships.
Figure 3:
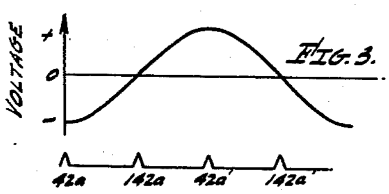

Fig. 2 illustrates a situation where the positive maximum of the input sine wave occurs coincidentally with the generation of the reference signal pulse 42*a* in primary winding 42, and the negative maximum of the input sine wave occurs at the time the reference signal pulse 42*a*′ is applied to primary winding 42′. With the circuits 10, 12 symmetrically arranged with respect to reference or ground potential, as shown in Fig. 1, output signals developed across both capacitors 46 and 46′ will have a maximum voltage differential. Therefore, the output of the pair of switching circuits 10, 12 is a maximum voltage of one polarity corresponding to the maximum voltage differential of the input sine wave. On the other hand, Fig. 3 illustrates the situation where the input sine wave has shifted 180° with respect to the reference pulses 42*a*, and 42*a*′; this means that the voltage differential of the output signals will be the same as in the situation illustrated in Fig. 2, but of opposite polarity.

Figure 4:
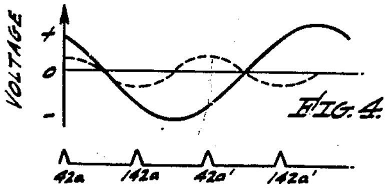

Fig. 4 illustrates a situation where, upon the switching circuits 10, 12 conducting, the input sine wave is shifted 45° ahead of its position in Fig. 2. Under such circumstances, the magnitude of the output signal will have a voltage differential that differs from the maximum by virtue of the 45° phase shift of the sine wave. The output signal from the switching circuits 10, 12, although of the same polarity as in the situation illustrated in Fig. 2, will have a voltage differential corresponding to the amplitudes of the input signal at the 45° and 225° points of Fig. 2.

Figure 5:
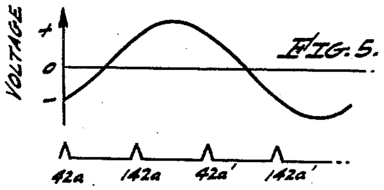

Fig. 5 illustrates a situation where the input signal is shifted 180° from its position in Fig. 4. Obviously, the output signals derived from the switching circuits 10, 12 in this situation will be the same in magnitude as in the situation illustrated in Fig. 4, but the polarities will be opposite to those of the output signals provided in the situation shown in Fig. 4.

It has been found that even harmonics of the input sine wave tend to cause output signals to be developed which are greater or less in magnitude than the output signal which truly represent the magnitude of the input sine wave. For example, referring to Fig. 4, the second harmonic of the input wave shown by dotted line 60 will increase the positive value of the input sine wave upon the occurrence of reference signal pulse 42*a* and decrease the negative value of the input sine wave upon the occurrence of reference signal pulse 42*a*′. Thus the output signal will not accurately represent the voltage differential of the input sine wave during the occurrence of reference pulses 42*a* and 42*a*′. To provide means for suppressing even harmonics where their effect must be minimized, and to obtain the desired operation of the phase detector network, a blocking capacitor 48 is connected between source 14 and the junctions, respectively, of anode 20 and cathode 22, and of anode 20′ and cathode 22′. Also, a resistor 50 connected across output capacitors 46 and 46′ has a center-tap 52 connected through an adjustable tap 53 of a potentiometer 54 connected across a source of voltage 55 having its negative terminal grounded. In order to realize the effectiveness of even harmonic suppression by such means, while permitting the input sine wave to operate the circuit as above described, the phase detector network will be analyzed on the basis of average currents flowing in the absence of blocking capacitor 48.

Figure 6:
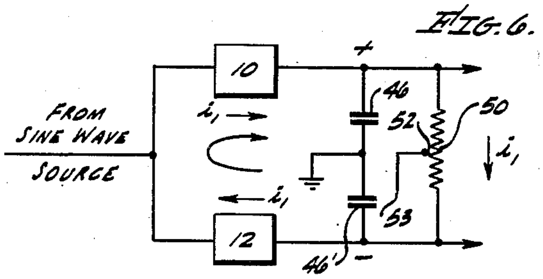
Figs. 6–7 are simplified circuit diagrams of the phase detector network of Fig. 1, which will be referred to for the purpose of analysis.

Referring to Fig. 6, with respect to the input sine wave, the voltage at one instant across capacitor 46 with respect to ground is indicated as positive (+), while the voltage across output capacitor 46′ is shown as negative (−) at the same instant. Remembering that, for the input sine wave, voltages developed across the output capacitors 46, 46′ are equal and opposite (Figs. 2–5), then the average current $i_1$ due to the input sine wave may be considered to flow through the pair of switching circuits 10, resistor 50, and the pair of switching circuits 12. Consequently, the average current $i_1$ may be considered as flowing in a closed loop, as indicated by the curved arrow in Fig. 7. Since the average currents corresponding to voltages developed across capacitors 46 and 46′ flow in a closed loop, they obviously do not require direct coupling to the sine wave source for their development. Consequently the insertion of the aforementioned blocking capacitor 48 between the sine wave source 14 and switching circuits 10 and 12 will have no influence upon the input sine wave, and accurate output signals will be developed, in the manner previously described, across output capacitors 46 and 46′.

Figure 7:
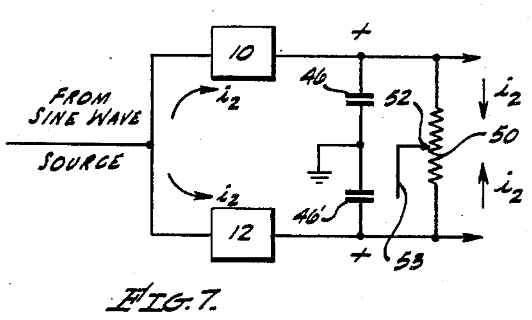

Referring to Fig. 7, with reference to the second harmonic of the input sine wave, the voltages across both output capacitors 46 and 46′ are shown as positive. Remembering that, insofar as the second harmonic is concerned, voltages developed across capacitors 46 and 46′ are of the same magnitude and polarity (Fig. 4), and considering average currents $i_2$ corresponding thereto, an average current $i_2$ would flow through the pair of switching circuits 10, the upper half of resistor 50, and lead 53 connected at center tap 52. Similarly, an average current $i_2$ would flow through the pair of switching circuits 12, the lower half of resistor 50, and lead 53. Accordingly, since equal currents must flow in the same direction through both pairs of switching circuits 10 and 12, obviously they depend for their development upon a direct connection to the sine wave source, which must supply the total average current $2i_2$, as indicated in Fig. 7. Therefore, it is clear that the insertion of blocking capacitor 48 will prevent such direct current flow, and accordingly, the second harmonic of the input sine wave will be suppressed.

It can be shown that any even harmonic of the input sine wave will, when present, tend to have the same effect as the second harmonic above described, and that blocking capacitor 48 will function to suppress all such even harmonics.

With reference to resistor 50, its adjustable center-tap connection to the voltage source 54 provides means for establishing the desired bias level for the output signals developed across capacitors 46 and 46'. For example, if lead 53 were connected to the ground terminal of voltage source 54, the voltages across capacitors 46 and 46' would be respectively positive and negative with respect to ground. However, for any connection of lead 53 to any point on voltage source 54 other than ground, such output signals would be equal and opposite with respect to the voltage at such point of connection.

Output signals obtained from the switching circuit 10, 12 may be applied to any suitable utilization device 56 to be operated in response to phase shifts of the input sine wave relative to the reference signal pulses previously described.

Figure 8:
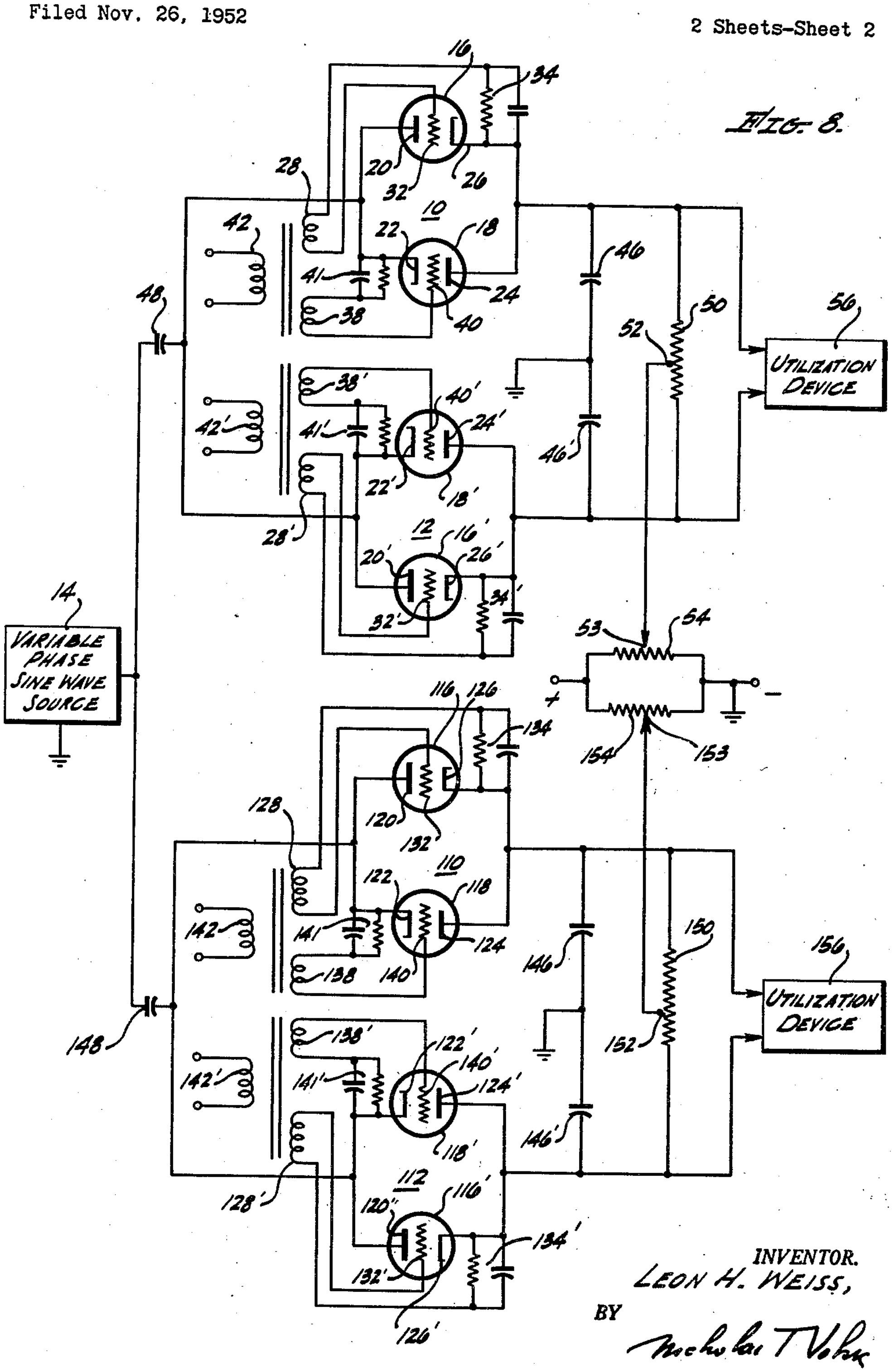
Fig. 8 is a circuit diagram illustrating one application of the circuit of Fig. 1.

The application of a phase detector network of the type described herein may be extended to obtain information from more than two portions of the input sine wave; Fig. 8 shows such an application.

Referring to Fig. 8, two pairs of switching circuits 10, 12 and 110, 112 of the type shown in Fig. 1 are connected to develop signals for controlling the operation of a pair of utilization devices 56, 156. Switching circuits 110, 112 correspond to respective switching circuits 10, 12 and corresponding portions thereof are represented by numbers of the portions of switching circuits 10, 12 increased by one hundred.

Reference signal pulses preferably are generated at fixed 90° intervals throughout each period of the sine wave input signal. Reference signal pulses 42*a*, 42*a'* (see Figs. 2–5) are applied to primary windings 42 and 42' respectively, as previously described, and reference signal pulses 142*a*, 142*a'* (Figs. 2–5) are applied respectively to primary windings 142, 142'.

Referring again to the illustrations of Figs. 2 to 5, as well as to Fig. 8, it can be seen that operation of switching circuits 110, 112, by applying the respective reference signal pulses 142*a* and 142*a'* at instants 90° and 270° later in the cycle of the input wave than reference signal pulse 42*a*, will provide output signals for controlling the operation of the utilization device 156 in accordance with the magnitudes of the input wave present at such instants. Thus two sets of output signals are obtained from the same input signal, and the devices 56, 156 may be operated in accordance with the signal information obtainable. For example, the switching circuits 110, 112 will have zero output in the situations illustrated in Figs. 2 and 3, while in each of the situations shown in Figs. 4 and 5, the output signals will have the same voltage differential as the signals derived from the other pair of switching circuits 10, 12, but of opposite polarity.

It should be noted that phase detector networks of the type described herein may also be used to detect variations in both amplitude and phase of a sine wave input signal, that is, in addition to detecting changes in phase as described above, the output voltages will have magnitudes depending upon the amplitudes of the input wave.

From the foregoing explanation, it is clear that there has been described an improved phase detector network of the keyed demodulator type, in which second harmonic distortion is substantially suppressed, and which is adapted for use in pairs to obtain signal information from different parts of a variable phase sine wave.

What is claimed is:

1. A phase detector network comprising, in combination, first and second pairs of electron tubes, each of said tubes having at least an anode, a cathode and a control grid, the tubes in each of said pairs having their respective anodes and cathodes interconnected to connect said tubes in series in a closed loop, a pair of output circuits coupled respectively to one anode-cathode junction of each of said loops, said output circuits being symmetrically connected with respect to a point of reference potential, a direct connection between the remaining anode-cathode junctions of each of said loops, a source of sinusoidal waves, capacitive means connected between said source and said direct connection for applying sinusoidal waves simultaneously to said pairs of tubes, and control means coupled to the grids of said tubes to controllably operate said pairs of tubes at fixed intervals, output signals developed across said output circuits during said intervals having voltage differentials which vary with the phase of the input waves, and means coupled to said output circuits for establishing a predetermined output signal level.

2. In a phase detector network of the keyed demodulator type employing a pair of capacitive output circuits symmetrical to ground, a network for selectively developing across said output circuits signals representative of changes in amplitude and phase of a sinusoidal wave with a minimum of distortion from even harmonics, said network comprising, in combination, a blocking capacitor coupled to said phase detector network, means coupled to said capacitor for applying said sinusoidal wave through said capacitor to said phase detector said capacitor being effective to substantially suppress even harmonics of said wave, control means for controllably operating said phase detector network only at fixed intervals of time to effect development across said output circuits of signals representative of the magnitude and phase of said wave, and means coupled to said output circuits for setting the bias level of the output signals at a predetermined value.

3. In a phase detector network of the keyed demodulator type employing two pairs of grid-controlled electron tubes connected, each connected in series in a closed loop, and each of said tubes being normally nonconductive, the combination comprising a variable phase sine wave source, a capacitor to said source and coupled to a first junction of each of said pairs of tubes, capacitive output circuits coupled to a second junction of each of said pairs of tubes and symmetrically connected with respect to a point of reference potential, said capacitor being effective to suppress even harmonics of said sine wave, control means coupled to said tubes to cause said pairs of tubes to conduct at fixed intervals, thereby to permit output signals to be developed across said capacitive output circuits that are representative of the amplitude and phase position of said sine wave with respect to said pulses, resistive means connected across said output circuits, and means connected between said point of reference potential and said resistive means for providing a predetermined operating level for said output signals.

4. A phase detector network comprising, in combination, first and second pairs of electron tubes, each having an anode, a cathode and a control grid, the anodes and cathodes of each pair of tubes being connected to conduct direct currents in a closed loop, input circuit means for appyling a variable phase sine wave to one anode-cathode connection of each of said pairs of tubes, a control circuit coupled to the grids of said tubes for effecting conduction of said first and second pairs of tubes at substantially 180° intervals of said sine wave, output circuits including a pair of capacitors connected respectively between a point of reference potential and one of the remaining anode-cathode connections of said pairs of tubes for developing output signals across said capacitors which have a voltage differential corresponding to the amplitude and phase of said sine wave at said intervals, said input circuit means including a blocking capacitor through which said sine wave is applied to said one anode-cathode connection of each of said pairs of tubes, said blocking capacitor being effective to suppress even harmonics of said sine wave, a center-tapped resistor connected across said output circuits, and control voltage means connected between said point of reference potential and the center-tap of said resistor for adjusting the voltage differential of said output signals.

5. A circuit arrangement for deriving, from a variable phase sine wave source, signals indicative of the amplitude and phase of the sine wave from said source, said arrangement comprising, in combination, a pair of phase detector networks each including two pairs of electron tubes, each of said tubes having an anode, a cathode and a control grid, the anodes and cathodes of each pair of tubes being directly interconnected for conducting direct currents in a closed loop, input circuit means coupled to source and including a capacitor connected to one anode-cathode junction of each pair of tubes, respective transformer means coupled to each pair of tubes for applying pulses in phase to the grids of each pair of tubes at substantially 180° intervals of the input wave and effecting conduction of the respective pairs of tubes at intervals, respective output circuits coupled to the remaining anode-cathode junctions of the pairs of tubes for developing output signals representative of the amplitude and phase of the input signal, and adjustable direct-current voltage supply means coupled to said output circuits for establishing a predetermined operating level for said output signals.

6. The combination defined in claim 5, in which each of said output circuits includes a pair of serially connected capacitors grounded at their junction, and in which said direct-current voltage supply means includes a center-tapped resistor shunting said capacitors, a source of independently controlled voltage, and a connection from said source of independently controlled voltage to the center-tap of said resistor to provide a predetermined bias level for the output signals.

7. The combination defined in claim 5, in which the 180° spaced pulses applied to one of said phase detector networks are displaced by substantially 90° of said input wave with respect to the 180° spaced pulses applied to the other one of said phase detector networks, whereby four equally spaced pulses are provided during each cycle of said input wave.

References Cited in the file of this patent

UNITED STATES PATENTS

| | | |
|---|---|---|
| Re. 23,275 | Field | Oct. 3, 1950 |
| 2,389,692 | Sherwin | Nov. 27, 1945 |
| 2,500,536 | Goldberg | Mar. 14, 1950 |
| 2,521,058 | Goldberg | Sept. 5, 1950 |
| 2,588,094 | Eaton | Mar. 4, 1952 |